United States Patent [19]

Taylor et al.

[11] 4,324,997

[45] Apr. 13, 1982

[54] DAMPENED BRUSH SYSTEM

[75] Inventors: Owen S. Taylor, Penn Township, Westmoreland County; Czeslaw A. Broniarek, Penn of Pa.

[73] Assignee: Westinghouse Electric Corp., Pittsburgh, Pa.

[21] Appl. No.: 119,690

[22] Filed: Feb. 8, 1980

[51] Int. Cl.³ .......................................... H02K 13/00
[52] U.S. Cl. ...................................... 310/248; 310/51
[58] Field of Search ............... 310/219, 51, 239, 245, 310/248–252, 220–222, 228, 229, 253, 230; 339/1 R, 5 S, 5 SM, 9 RY

[56] References Cited

U.S. PATENT DOCUMENTS

| | | | |
|---|---|---|---|
| 1,821,405 | 9/1931 | Riese | 310/248 |
| 2,454,579 | 11/1948 | Stauffer | 310/249 |
| 2,607,817 | 8/1952 | Peterlik | 310/245 |
| 2,780,743 | 2/1957 | Elsey | 310/228 |
| 2,923,842 | 2/1960 | Helwig | 310/248 |
| 3,017,529 | 1/1962 | Helwig | 310/248 |
| 3,423,715 | 1/1969 | Drescher | 310/248 |
| 3,450,594 | 6/1969 | Hennessy | 310/251 |
| 3,786,292 | 1/1974 | Wiggs | 310/251 |

OTHER PUBLICATIONS

"Mechanical Stability of Solid Brush Current Collection Systems", Broniarek et al; Westinghouse R & D; Pittsburgh, Pa., 4/9/1979.

Primary Examiner—R. Skudy
Attorney, Agent, or Firm—F. J. Baehr, Jr.

[57] ABSTRACT

Damping material is disposed on the trailing distal edge of a monolithic brush to enhance the brush's vibration stability. The dampening material is preferably an elastomer such as neoprene and extends along the side of the brush which contains the trailing edge of the contact surface a distance substantially greater than the thickness of the damping material.

2 Claims, 2 Drawing Figures

DAMPENED BRUSH SYSTEM

GOVERNMENT CONTRACT

The invention described herein was made in the course of, or under, Contract No. N000 14-76-C-0683 with the United States Department of Defense and the Government has rights in this invention pursuant to that contract.

BACKGROUND OF THE INVENTION

This invention relates to brushes for electrodynamic machines and more particularly to a damping system for solid brushes.

Brushes vibrate and wear excessively as a result of self excitation due to inherent instability of the brush system. An in-depth study of brush stability has resulted in analysis that allows strategic location of damping to stabilize the brush system and reduce vibration.

SUMMARY OF THE INVENTION

In general, a brush system for a dynamoelectric machine, when made in accordance with this invention, comprises a generally solid brush, holding means for the brush and damping means disposed at the distal end of the brush diagonally opposite the leading edge thereof.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
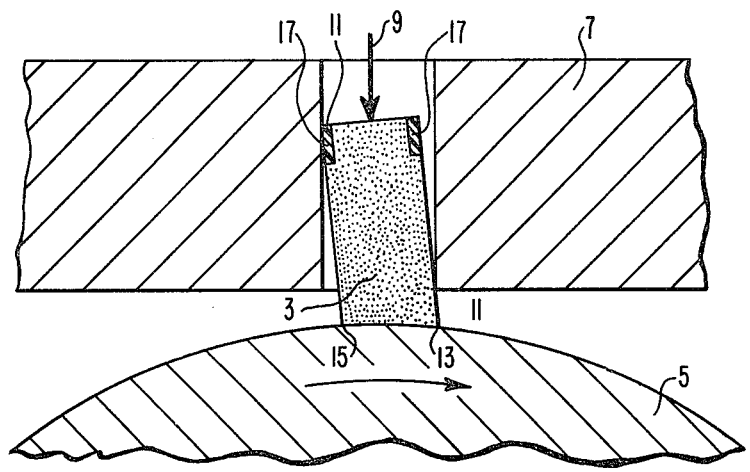
FIG. 1 is a schematic diagram of a brush damping system made in accordance with this invention.

Referring now to the drawings in detail and in particular to FIG. 1, there is shown a damping system for a monolithic brush 3 in a dynamoelectric machine (not shown) having a rotor 5. The damping system comprises the brush 3, a brush holder 7, which slidably receives the brush 3, and biasing means 9 for biasing the brush 3 against the rotor 5.

The brush 3 has a rubbing and current collecting surface 11 on one end thereof with a leading and trailing edge 13 and 15, respectively. Damping means such as a strip of neoprene or other damping materials 17 is disposed on the distal edge 19 of the brush diagonally opposite the leading edge 13. The brush 3 pivots about the leading edge of the brush holder 7 causing the damping means 17 to contact the holder 7 and dampen the self-induced vibration resulting from the rotation of the rotor 5. Preferably the length of the damping material 17 extending along the side of the brush 3 containing the trailing edge of the contact surface is substantially greater than the thickness of the damping material 17.

By placing damping means 17 on the both distal edges of the brush, the brush cannot be improperly inserted in the holder when it has a generally rectangular cross-section.

Figure 2:
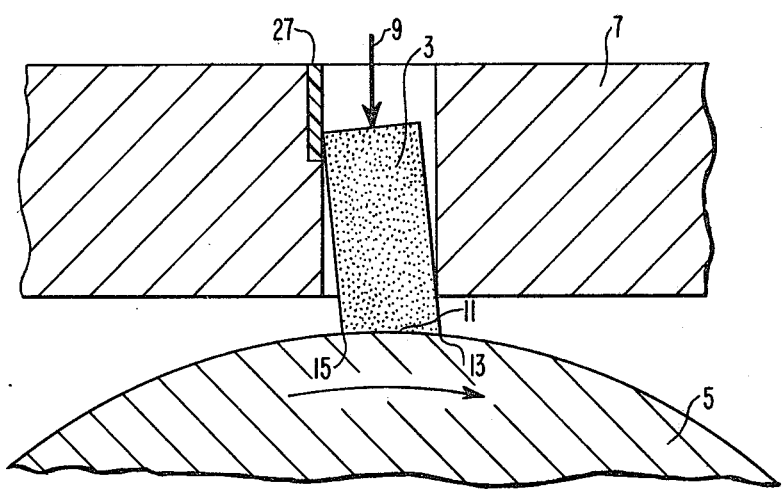
FIG. 2 is a schematic diagram of an alternate brush damping system.

FIG. 2 shows an alternate embodiment in which damping means 27 is disposed in the holder 7 so as to dampen the edge of the brush disposed diagonally opposite the leading edge of the rubbing surface 11.

The damping means hereinbefore described stabilizes the brush by placing the damping material at the appropriate location to provide optimum damping.

What we claim is:

1. A monolithic brush for a dynamoelectric machine having an elastomer insert on the edge of the brush diagonally opposite the leading edge of the contact surface and extending along the side of the brush containing the trailing edge of the contact surface, the length of the insert extending along the side of the brush containing the trailing edge of the contact surface being substantially greater than the thickness of the insert.

2. A monolithic brush as set forth in claim 1, wherein the elastomer insert is neoprene.

* * * * *